(12) United States Patent
Allen

(10) Patent No.: US 8,036,795 B2
(45) Date of Patent: Oct. 11, 2011

(54) IMAGE BASED OCCUPANT CLASSIFICATION SYSTEMS FOR DETERMINING OCCUPANT CLASSIFICATION AND SEAT BELT STATUS AND VEHICLES HAVING SAME

(75) Inventor: Brian T. Allen, Hilliard, OH (US)

(73) Assignee: Honda Motor Company, Ltd., Tokyo (JP)

( * ) Notice: Subject to any disclaimer, the term of this patent is extended or adjusted under 35 U.S.C. 154(b) by 486 days.

(21) Appl. No.: 12/247,376

(22) Filed: Oct. 8, 2008

(65) Prior Publication Data
US 2010/0087990 A1    Apr. 8, 2010

(51) Int. Cl.
*B60R 21/32* (2006.01)
*B60R 22/48* (2006.01)
*B60Q 1/00* (2006.01)

(52) U.S. Cl. .......... 701/45; 280/735; 180/268; 382/103; 340/457.1

(58) Field of Classification Search .......... 382/103, 382/104; 340/457.1; 701/45; 280/735; 180/268
See application file for complete search history.

(56) References Cited

U.S. PATENT DOCUMENTS

| | | | |
|---|---|---|---|
| 4,885,566 A | 12/1989 | Aoki et al. | |
| 5,187,465 A | 2/1993 | Stonerook et al. | |
| 5,330,226 A | 7/1994 | Gentry et al. | |
| 5,440,913 A | 8/1995 | Crispin et al. | |
| 5,726,887 A | 3/1998 | Spies et al. | |
| 5,785,347 A | 7/1998 | Adolph et al. | |
| 5,927,752 A | 7/1999 | Brandin | |
| 6,151,540 A | 11/2000 | Anishetty | |
| 6,203,059 B1 | 3/2001 | Mazur et al. | |
| 6,218,739 B1 | 4/2001 | Fendt | |
| 6,598,900 B2 | 7/2003 | Stanley et al. | |
| 6,771,175 B1 | 8/2004 | Eagle et al. | |
| 6,781,676 B2 | 8/2004 | Wallace et al. | |
| 6,961,443 B2 * | 11/2005 | Mahbub | 382/100 |
| 6,985,077 B2 | 1/2006 | Nathan et al. | |
| 7,039,513 B2 | 5/2006 | Hermann et al. | |
| 7,095,002 B2 | 8/2006 | Kong et al. | |
| 7,110,571 B2 * | 9/2006 | Occhipinti | 382/104 |

(Continued)

FOREIGN PATENT DOCUMENTS

JP    2004-161087 A  *  6/2004

(Continued)

OTHER PUBLICATIONS

U.S. Appl. No. 12/247,343, Titled: Illumination Source for an Image Based Occupant Classification System and Vehicle Using Same, Filed: Oct. 8, 2008; Inventor: Brian T. Allen, in its entirety.

(Continued)

*Primary Examiner* — Ruth Ilan
(74) *Attorney, Agent, or Firm* — Ulmer & Berne LLP

(57) ABSTRACT

An image based occupant classification system includes an image sensor and an image processor. The image sensor is configured to capture vehicular occupant information. The image processor is in communication with the image sensor. The image processor is configured to perform first sampling operations upon the vehicular occupant information to determine occupant classification. The image processor is further configured to perform second sampling operations upon the vehicular occupant information to determine a seat belt status. Each of the first sampling operations is conducted at a separate time from each of the second sampling operations. Vehicles are also provided.

21 Claims, 4 Drawing Sheets

U.S. PATENT DOCUMENTS

| | | |
|---|---|---|
| 2005/0111700 A1 | 5/2005 | O'Boyle et al. |
| 2005/0263992 A1 | 12/2005 | Matsuda |
| 2006/0049929 A1 | 3/2006 | Lawrence et al. |
| 2006/0092401 A1 | 5/2006 | Troxell et al. |
| 2007/0055428 A1* | 3/2007 | Kong et al. .................. 701/45 |
| 2007/0085669 A1* | 4/2007 | Becker et al. ............. 340/457.1 |
| 2007/0194900 A1 | 8/2007 | Hawkins et al. |
| 2007/0195990 A1 | 8/2007 | Levy |
| 2007/0206836 A1 | 9/2007 | Yoon et al. |
| 2007/0222572 A1 | 9/2007 | Downey et al. |
| 2008/0094195 A1* | 4/2008 | Odate et al. ................. 340/438 |
| 2008/0164682 A1* | 7/2008 | Matsuda ....................... 280/735 |
| 2009/0034794 A1* | 2/2009 | Ishikawa ....................... 382/103 |

FOREIGN PATENT DOCUMENTS

JP  2007-055294 A  *  3/2007

OTHER PUBLICATIONS

U.S. Appl. No. 12/247,540, Titled: Methods for Testing an Image Based Occupant Classification System, Filed: Oct. 8, 2008; Inventor: Brian T. Allen, in its entirety.

* cited by examiner

IMAGE BASED OCCUPANT CLASSIFICATION SYSTEMS FOR DETERMINING OCCUPANT CLASSIFICATION AND SEAT BELT STATUS AND VEHICLES HAVING SAME

TECHNICAL FIELD

An image based occupant classification system ("IBOCS") can monitor vehicular occupant information to determine an occupant's classification and to determine a status of a seat belt.

BACKGROUND

An IBOCS can monitor an occupant in order to control safety devices on a vehicle. In particular, an IBOCS can assess an occupant's classification (e.g., size, shape, position) and/or an occupant's movement to control deployment of an airbag. Conventionally, seat belt monitoring on a vehicle is provided separately from the IBOCS. For example, a Supplemental Restraint System ("SRS") can include a seat belt latch monitor that facilitates occupant notification when a seat belt is not being worn. Conducting occupant and seat belt monitoring on a vehicle can thus require the addition of dedicated hardware for each process.

SUMMARY

According to one embodiment, an image based occupant classification system comprises an image sensor and an image processor. The image sensor is configured to capture vehicular occupant information. The image processor is in communication with the image sensor. The image processor is configured to perform first sampling operations upon the vehicular occupant information to determine occupant classification. The image processor is further configured to perform second sampling operations upon the vehicular occupant information to determine a seat belt status. Each of the first sampling operations is conducted at a separate time from each of the second sampling operations.

According to another embodiment, a vehicle comprises a passenger compartment, a seat belt, an image sensor, and an image processor. The seat belt is configured to selectively secure a seated occupant within the passenger compartment. The image sensor is configured to capture vehicular occupant information. The image processor is in communication with the image sensor and is configured to perform first and second sampling operations upon the vehicular occupant information. The image processor is configured to determine occupant classification based upon the first sampling operations. The image processor is further configured to determine a status of the seat belt based upon the second sampling operations. Each of the first sampling operations is performed by the image processor at a separate time from each of the second sampling operations.

According to yet another embodiment, a method comprises capturing vehicular occupant information and performing first sampling operations upon the vehicular occupant information. The method further comprises determining occupant classification from the first sampling operations and performing second sampling operations upon the vehicular occupant information at separate times than the first sampling operations. The method additionally comprises determining seat belt status from the second sampling operations.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
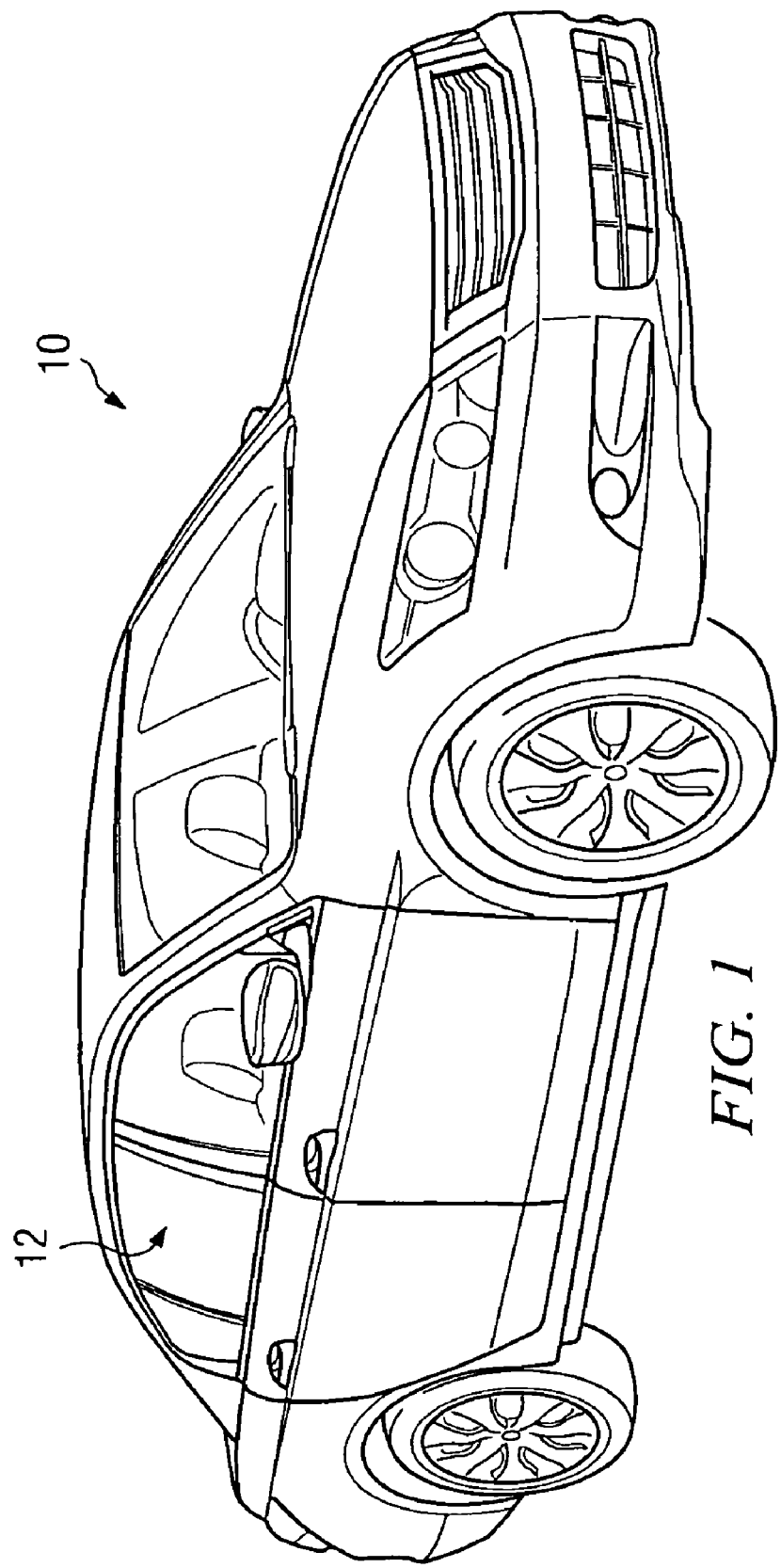
FIG. 1 is a perspective view depicting a vehicle in accordance with one embodiment.

The present invention and its operation are hereinafter described in detail in connection with the views and examples of FIGS. 1-6, wherein like numbers indicate the same or corresponding elements throughout the views. An IBOCS in accordance with one embodiment can be provided on a vehicle 10 which is shown in FIG. 1 to comprise an automobile. However, an IBOCS can alternatively be provided upon any of a variety of alternative vehicles, such as, for example, a truck, a van, a recreational vehicle, a utility vehicle, an aircraft, agricultural equipment, or construction equipment. Though the vehicle 10 is shown in FIGS. 1 and 3 to be of a type which includes a passenger compartment 12 defined in part by pillars and a ceiling and which is accessible through four respective passenger doors, it will be appreciated that vehicles in accordance with other embodiments can include any of a variety of other suitable passenger compartments (e.g., provided within a two-door sedan, pickup truck, or convertible).

Figure 2:
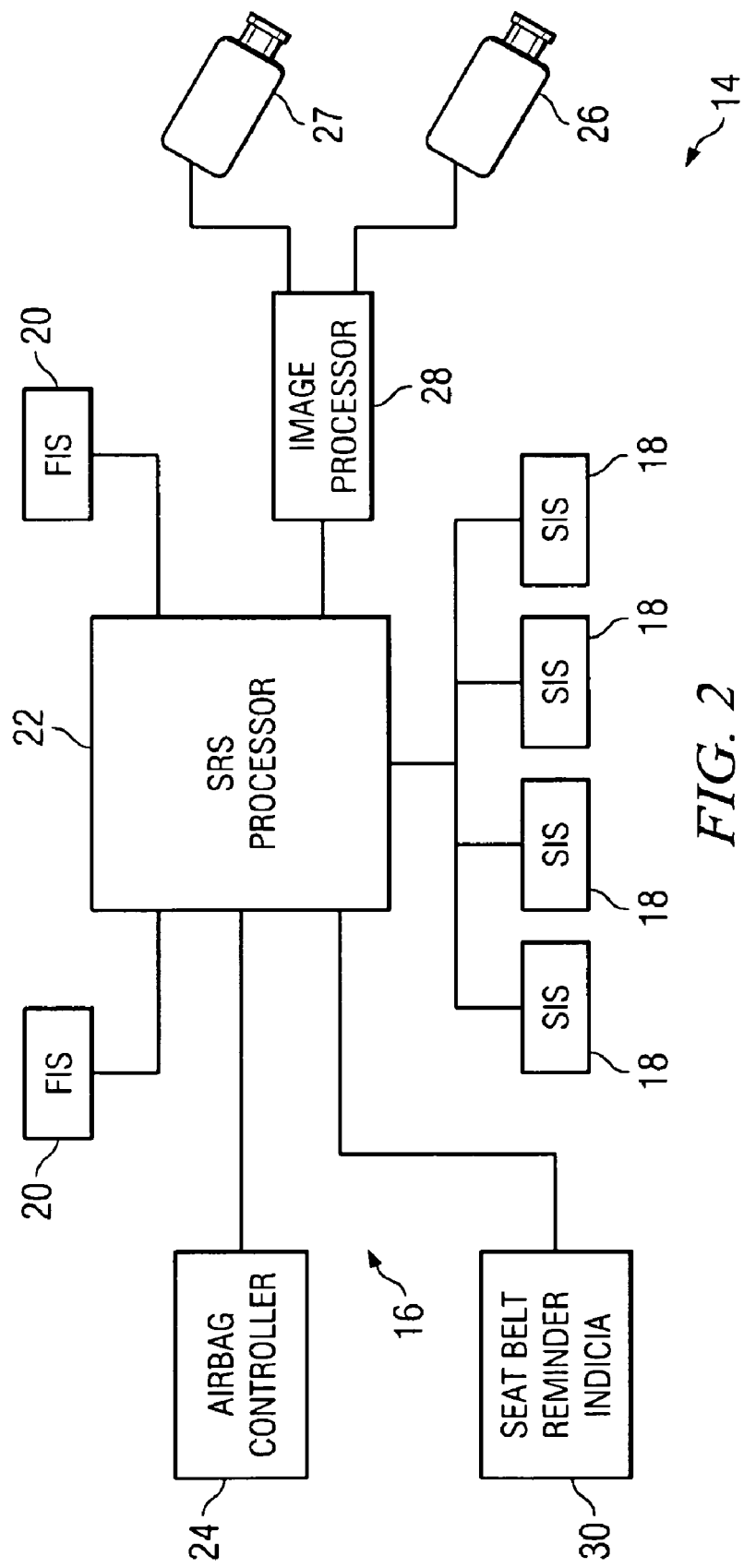
FIG. 2 is a schematic view depicting an IBOCS of the vehicle of FIG. 1.
Figure 3:
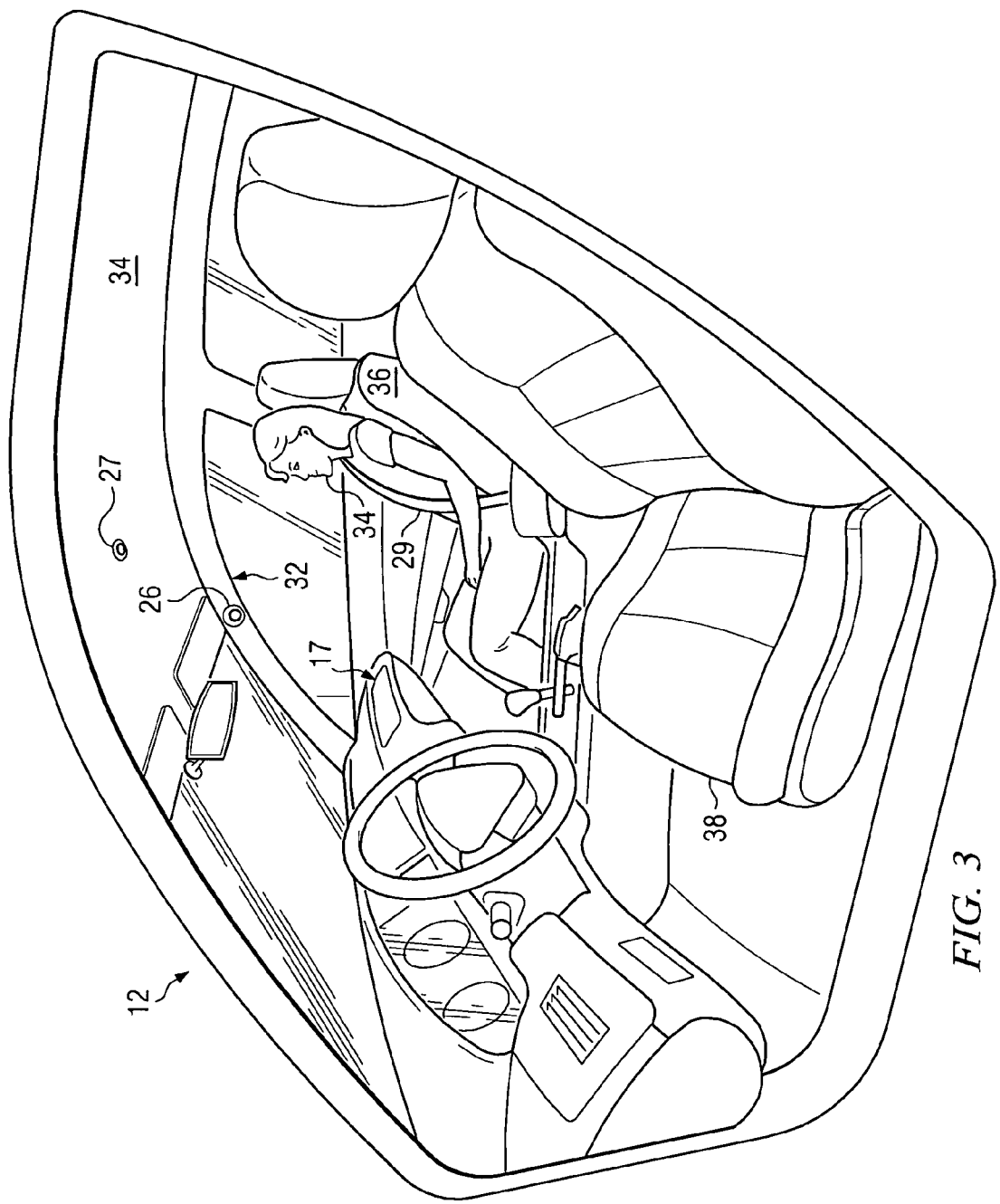
FIG. 3 is an enlarged perspective view depicting a portion of a passenger compartment of the vehicle of FIG. 1, wherein an image sensor in accordance with one embodiment is provided.

As illustrated in FIG. 2, an IBOCS 14 can include a supplemental restraint system ("SRS") 16. The SRS 16 can include various safety devices (e.g., seat belt retractors, airbags, crash avoidance systems) that can be actuated during a collision. The SRS 16 can be configured to monitor vehicular collision conditions. The SRS 16 is shown in FIG. 2 to include side impact sensors 18 and front impact sensors 20. In one embodiment, the side impact sensors 18 and front impact sensors 20 can include accelerometers. In such an embodiment, the accelerometers can be disposed along the vehicle to monitor the acceleration encountered during a collision. For example, the side impact sensors 18 can be disposed along a side of the vehicle 10 (e.g., within one or more side pillars or doors) such that a collision along a side of the vehicle 10 can be monitored. Additionally, the front impact sensors 20 can be disposed along a front of the vehicle 10 (e.g., within a front bumper) such that a collision along a front of the vehicle 10 can be monitored. In other embodiments, impact sensors can include an image sensor, a radar unit, or a LIDAR unit. It will be appreciated that an SRS can include any of a variety of additional or alternative arrangements for monitoring vehicular collision conditions. For example, the SRS 16 can include $G_x$ and $G_y$ sensors to monitor vehicular acceleration. It will also be appreciated that, in addition or alternative to monitoring collision conditions that are native to the vehicle, the SRS 16 can monitor any of a variety of collision conditions external to the vehicle 10. For example, the SRS 16 can include an external sensor, such as a radar headway sensor, to monitor approaching objects, such as vehicles or pedestrians.

The SRS 16 can analyze the collision conditions to determine whether the vehicle 10 is experiencing a collision. In one embodiment, as illustrated in FIG. 2, the SRS 16 can include an SRS processor 22 which can determine whether the vehicle 10 is experiencing a collision. As illustrated in FIG. 2, the side and front impact sensors 18, 20 can be in communication with the SRS processor 22 such that the collision conditions can be transmitted to the SRS processor 22. In one embodiment, the side and front impact sensors 18, 20 can transmit collision conditions to the SRS processor 22 via communication cable (e.g., wire or fiber optic in a drive-by-wire configuration). In another embodiment, the side and front impact sensors 18, 20 can transmit collision conditions to the SRS processor 22 wirelessly. It will be appreciated that the SRS processor 22 can include any of a variety of suitable SRS controllers and/or processors to facilitate receipt and analysis of the collision conditions. It will also be appreciated, however, that the SRS processor 22 can provide additional or alternative functionality to the SRS 16. For example, in lieu of, or in addition to, side and/or front impact sensors 18, 20 mounted along the vehicle, as described above, the SRS processor 22 can include side impact sensors (e.g., $G_x$ sensors), a front impact sensor (e.g., a $G_y$ sensor), and/or any of a variety of other collision sensors.

If the SRS 16 determines that a collision is occurring, various safety devices (e.g., seat belt retractors, airbags, crash avoidance systems) within or associated with the SRS 16 can be actuated. In one embodiment, as illustrated in FIG. 2, the SRS processor 22 can be in communication with an airbag controller 24. When the SRS processor 22 determines that a collision is occurring (e.g., from the collision conditions), the SRS processor 22 can actuate the airbag controller 24 to facilitate selective deployment of one or more airbags (e.g., 17 in FIG. 3) within the vehicle 10. In one embodiment, the airbag controller 24 can include a squib. In such an embodiment, the SRS processor 22 can transmit an electronic signal to the squib to deploy one or more airbags.

The IBOCS 14 can include an image sensor 26 in communication with an image processor 28, as illustrated in FIG. 2. The image sensor 26 can be configured to capture vehicular occupant information from the passenger compartment 12 and provide the vehicular occupant information to the image processor 28 (e.g., wirelessly and/or via communication cables). Though the image sensor 26 and the SRS processor 22 are shown in FIG. 2 to communicate indirectly (e.g., by way of the image processor 28), it will be appreciated that an image sensor and an SRS processor can alternatively communicate directly. In one embodiment, the image sensor 26 can be a charge-coupled-device (CCD) configured to capture infrared or near-infrared images. However, it will be appreciated that the image sensor 26 can alternatively or additionally comprise a thermographic camera, a CMOS sensor, a radar unit and/or any of a variety of other suitable alternative components or arrangements. The IBOCS 14 can additionally include an illumination source (not shown) to improve image quality of the captured images.

The image processor 28 can determine an occupant's classification from the vehicular occupant information. In one embodiment, the image processor 28 can determine the presence of an occupant within the passenger compartment 12. In certain other embodiments, the image processor 28 can determine the status of an occupant (e.g., adult or child), movement of an occupant, a position of an occupant, and/or any of a variety of other types of suitable alternative occupant classification information. The image processor 28 can also determine a status of a seat belt (e.g., 29 in FIG. 3) from the vehicular occupant information. In one embodiment, the image processor 28 can analyze images captured from the image sensor 26 to determine whether a portion of a seat belt is placed across the front of an occupant. In another embodiment, the image processor 28 can analyze images captured from the image sensor 26 to determine whether a tongued portion of a seat belt is engaged with an associated buckle. In certain other embodiments, the image processor 28 can determine whether a seat belt is improperly securing a passenger (e.g., twisted or partially buckled), an amount of seat belt detection during a collision, whether a seat belt malfunction (e.g., fraying, tearing) has occurred, and/or any of a variety of other characteristics involving seat belt status.

Although the image processor 28 is shown to be in communication with the SRS processor 22 (e.g., wirelessly or via communication cables), it will be appreciated that an image processor can be provided any of a variety of suitable alternative configurations. For example, in one embodiment, an image processor can be integrated within an SRS processor.

It will be appreciated that the IBOCS 14 can regulate actuation of the safety devices based upon an occupant's classification. In one embodiment, the IBOCS 14 can regulate actuation of airbags according to the presence and/or status of an occupant (e.g., adult or child). For example, when a child or child seat occupies a vehicular seat, deployment of airbags can be suppressed. In another example, when a seat is unoccupied, deployment of airbags can be suppressed. In another embodiment, the IBOCS 14 can dynamically regulate actuation of airbags according to the movement of an occupant. For example, deployment of an airbag can be tailored to best cushion an occupant's movement (e.g., slowed if a passenger is positioned too close to a dashboard, individual portions of the airbag more fully deployed to account for lateral movement of an occupant during a collision). It will be appreciated that the IBOCS 14 can utilize an occupant's classification in any of a variety of suitable manners.

It will be appreciated that in one embodiment, the IBOCS 14 can regulate the safety devices in anticipation of a collision. For example, when the vehicle 10 is started, an occupant can be identified as an adult, child, or child seat. Based upon that identification, deployment of airbags can be placed in a suppressed state (e.g., for a child or child seat) or a permissive state (e.g., for an adult). It will also be appreciated that, in another embodiment, the IBOCS 14 can regulate the safety devices during a collision. For example, when the vehicle 10 initially enters into a collision, the IBOCS can assess the presence and/or status of an occupant (e.g., adult or child) and can actuate (or not actuate) safety devices as appropriate based upon that assessment. In yet another example, during a collision, actuation of the safety devices can be controlled based upon the movement of an occupant.

It will be appreciated that the IBOCS 14 can regulate actuation of the safety devices based upon seat belt status information obtained by the image processor 28. In one embodiment, the SRS processor 22 is configured to selectively inhibit the airbag controller 24 according to the seat belt status. For example, when the IBOCS 14 determines from the vehicular occupant information that an occupant in not wearing a seat belt, the SRS processor 22 can depower the airbag controller 24 (and/or other components associated with an airbag and/or other safety devices) such that an airbag is not deployed during a collision.

It will be appreciated that the IBOCS 14 can be configured to indicate the seat belt status. In one embodiment, the IBOCS 14 can be configured to notify an occupant when a seat belt is not being worn. In such an embodiment, as illustrated in FIG. 2, the SRS 16 can include a seatbelt reminder indicia 30 (e.g., Passenger Tattle Tale) in communication with the SRS processor 22. When an occupant (e.g., 34 in FIG. 3) is not wearing a seat belt (e.g., 29 in FIG. 3), the seat belt reminder indicia 30 can alarm (e.g., visually, audibly) in order to remind the occupant to wear the seat belt. It will be appreciated that the seat belt reminder indicia 30 can indicate a status of a seat belt in any of a variety of suitable alternative arrangements (e.g., transmit an indicator to a vehicular tracking system to facilitate remote monitoring of a status of a seat belt).

As illustrated in FIG. 3, the image sensor 26 can be disposed along a pillar 32 of the vehicle 10 such that vehicular occupant information can be captured for an occupant 34 seated in a passenger seat 36. However, it will be appreciated that additional or alternative image sensors can be provided in any of a variety of other suitable locations and/or arrangements within or adjacent to the passenger compartment 12 of the vehicle 10. For example, as shown in FIG. 3, an image sensor 27 can be attached to the ceiling 34. In such an embodiment, the image sensors 26, 27 can be separated by a known distance such that a 3-dimensional image can be produced. In yet another example, an image sensor can be provided adjacent to a driver's seat 38 to capture vehicular occupant information for a driver (not shown) and can, for example, be attached to a dashboard, center console, door panel, or any of a variety of other suitable features within the passenger compartment of a vehicle. In yet another example, an image sensor can be provided adjacent to rear seats of a vehicle to capture vehicular occupant information for passengers seated in these rear seats. It will be appreciated that a vehicle can include image sensors provided in any or all of these locations. It will also be appreciated that the IBOCS can additionally or alternatively include illumination sources provided in any or all of these locations.

The image processor 28 can be configured to perform first sampling operations upon the vehicular occupant information in order to determine an occupant's classification. In one embodiment, in performing the first sampling operations, the image processor 28 can be configured to selectively actuate the image sensor 26 and to analyze the vehicular occupant information captured by the image sensor 26. However, it will be appreciated that the first sampling operations can include any of a variety of additional or alternative operations useful in determining occupant classification.

It will be appreciated that the first sampling operations can be triggered by a clock signal that is native to the IBOCS 14 (e.g., a clock signal generated by the image processor 28). In one embodiment, each first sampling operation can be triggered by a change in the clock signal (e.g., a rising edge or a failing edge of the clock signal). It will also be appreciated that the frequency of the first sampling operations can be varied according to the particular occupant classification being determined. When it is desirable to determine vehicular occupant information which is not subject to frequent change (e.g., whether the occupant is an adult or child), the first sampling operations can be triggered less frequently. However, when it is desirable to determine vehicular occupant information which is subject to frequent change (e.g., whether the occupant has moved to a new position), the first sampling operations can be triggered more frequently. For example, if the first sampling operations are intended to detect movement of an occupant, since movement of an occupant can change frequently, the first sampling operations can be triggered frequently (e.g., every 50 milliseconds).

It will be appreciated that any of a variety of first sampling operations can occur as a result of each trigger. For example, in one embodiment, the first sampling operations can alternate between actuating the image sensor 26 to capture vehicular occupant information and analyzing the captured vehicular occupant information. In such an embodiment, on a first clock cycle, the image sensor 26 can be actuated to capture vehicular occupant information. On a subsequent clock cycle, the vehicular occupant information captured by the image sensor 26 (e.g., on a previous clock cycle) can be analyzed to determine occupant classification. In another embodiment, each first sampling operation can actuate the image sensor 26 to capture vehicular occupant information and can cause the captured vehicular information to be analyzed.

The image processor 28 can also be configured to perform second sampling operations upon the vehicular occupant information in order to determine an occupant's seat belt status. In one embodiment, in performing the second sampling operations, the image processor 28 can be configured to selectively actuate the image sensor 26 and to analyze the vehicular occupant information captured by the image sensor 26. It will be appreciated that the second sampling operations can include any of a variety of additional or alternative operations useful in determining seat belt status.

It will be appreciated that, similar to the first sampling operations, the second sampling operations can be triggered by a clock signal (e.g., each second sampling operation can be triggered by a rising edge or a falling edge of a clock signal). It will also be appreciated that the frequency of the second sampling operations can be varied according to the particular seat belt status being determined. When it is desirable to determine vehicular occupant information which is not subject to frequent change (e.g., whether an occupant is wearing a seat belt), the second sampling operations can be triggered less frequently. However, when it is desirable to determine vehicular occupant information which is subject to frequent change (e.g., whether the a change in seat belt deflection), the second sampling operations can be triggered more frequently. For example, if the second sampling operations are intended to detect seat belt deflection, since seat belt deflection can change frequently, the second sampling operations can be triggered frequently (e.g., every 50 milliseconds). In another example, if the second sampling, operations are intended to detect whether an occupant is wearing a seat belt, since such use can change less frequently, the second sampling operations can be triggered less frequently (e.g., every 2 seconds).

It will be appreciated that any of a variety of second sampling operations can occur as a result of each trigger. For example, in one embodiment, the second sampling operations can alternate between actuating the image sensor 26 to capture vehicular occupant information and analyzing the captured vehicular occupant information. In such an embodiment, on a first clock cycle, the image sensor 26 can be actuated to capture vehicular occupant information. On a subsequent clock cycle, the vehicular occupant information captured by the image sensor 26 (e.g., on a previous clock cycle) can be analyzed to determine seat belt status. In another embodiment, each second sampling operation can actuate the image sensor 26 to capture vehicular occupant information and can cause the captured vehicular information to be analyzed.

Figure 4:
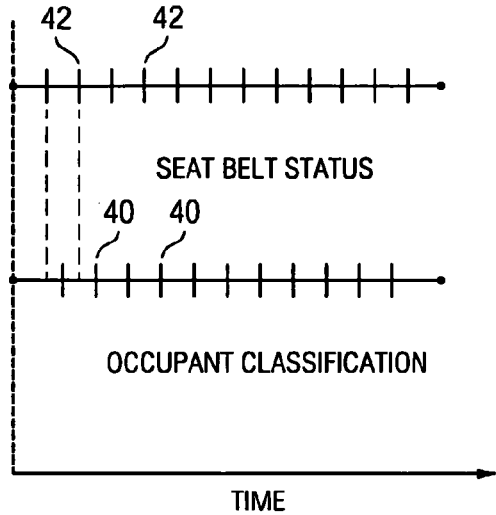
FIG. 4 is a plot depicting first sampling operations and second sampling operations of the IBOCS of FIG. 2 according to one embodiment.
Figure 5:
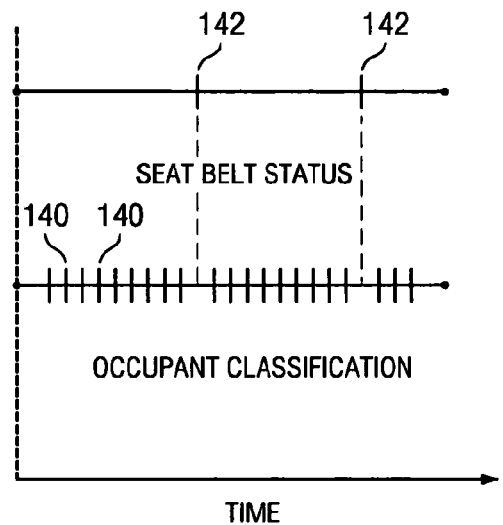
FIG. 5 is a plot depicting first sampling operations and second sampling operations of the IBOCS of FIG. 2 according to another embodiment.

It will be appreciated that the image processor 28 can be configured such that the first sampling operations are conducted at a separate time from each of the second sampling operations. In one embodiment, as illustrated in FIG. 4, each of the first sampling operations (e.g., 40) and each of the second sampling operations (e.g., 42) can be performed successively. In such an embodiment, a first sampling operation 40 can be performed on a first clock cycle to determine occupant classification. On a subsequent clock cycle, a second sampling operation 42 can be performed to determine seat belt status. In another embodiment, as illustrated in FIG. 5, at least about ten first sampling operations 140 can be performed for each second sampling operation 142 (e.g., such as when the first sampling operation is intended to determine whether an occupant is a child or an adult and the second sampling operation is intended to identify whether the occupant is wearing the seat belt. In such an embodiment, first sampling operations 140 can be performed on successive clock cycles to determine occupant classification. On a subsequent clock cycle, a second sampling operation 142 can be performed to determine seat belt status. It will be appreciated from FIGS. 4-5 that the triggering orders of the first and second sampling operations can be provided in any of a variety of suitable arrangements to facilitate determination of an occupant classification and a seat belt status. The order and frequency of first and second sampling operations can be established based upon the type of occupant classification and seat belt status information sought by the IBOCS.

Figure 6:
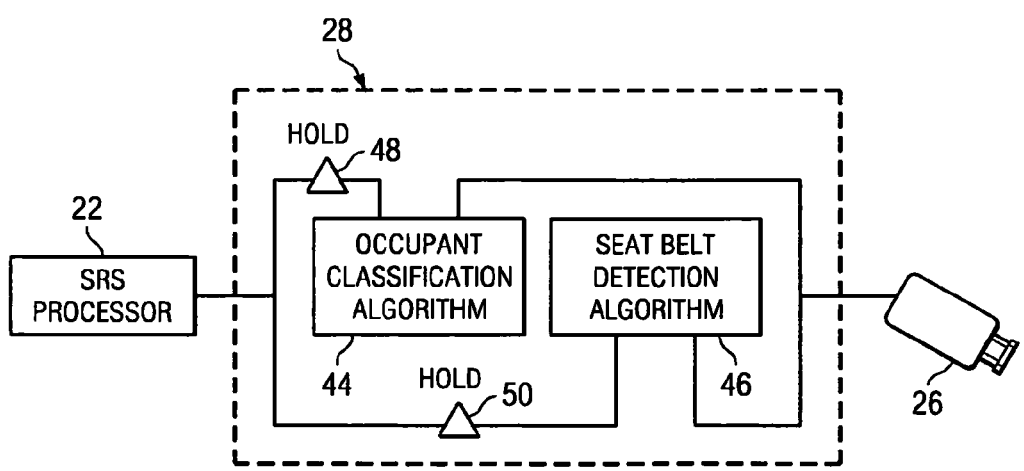
FIG. 6 is a schematic view depicting a portion of the IBOCS of FIG. 2 in which further details of the image processor are illustrated.

As illustrated in FIG. 6, the image processor 28 can be configured to implement an occupant classification algorithm 44 and a seat belt detection algorithm 46. In one embodiment, the occupant classification algorithm 44 can perform first sampling operations (e.g., 40, 140 in FIGS. 4-5) and the seat belt detection algorithm 46 can perform second sampling operations (e.g., 42, 142 in FIGS. 4-5). In one embodiment, the SRS processor 22 can be in communication with each of the occupant classification algorithm 44 and the seat belt detection algorithm 46. In this configuration, first and second holds 48, 50 can be alternatively applied (e.g., by the SRS processor 22) to the respective occupant classification algorithm 44 and seat belt detection algorithm 46 to ensure that each of the first sampling operations is conducted at a separate time from each of the second sampling operations. It will be appreciated that, during the application of either the first or second hold 48, 50, the non-held algorithm can be employed one time, or many times. For example, when the seat belt detection algorithm is employed, the first hold 48 can be applied upon the occupant classification algorithm 44. During the application of the first hold 48, the seat belt detection algorithm 46 can be employed one or many times to perform second sampling operations on vehicular occupant information (e.g., as shown in FIGS. 4 and 5). In another example, when the occupant classification algorithm 44 is employed, the second hold 50 can be applied upon the seat belt detection algorithm 46. During the application of the second hold 50, the occupant classification algorithm 44 can be employed one or many times to perform first sampling operations on vehicular occupant information (e.g., as shown in FIGS. 4 and 5). It will be appreciated that the occupant classification algorithm 44 and seat belt detection algorithm 46 can include any of a variety of algorithms which facilitate respective determination of occupant classification and seat belt status.

A method can also be provided for employing the above-described embodiment. The method can include capturing vehicular occupant information and performing first sampling operations upon the vehicular occupant information. The method can further include determining occupant classification from the first sampling operations and performing second sampling operations upon the vehicular occupant information at separate times than the first sampling operations. The method can additionally include detecting seat belt status from the second sampling operations.

In one embodiment, the image processor 28 and the image sensor 26 can communicate with each other (e.g., bidirectional communication) to facilitate occupant classification and/or seat belt status detection. In particular, the image processor 28 can control the actuation of the image sensor 26. The captured vehicular occupant information can be transmitted from the image sensor 26 to the image processor 28 which can then analyze the images to determine occupant classification and/or seat belt status. In another embodiment, the image sensor 26 can control its own actuation such that it provides a steady flow of image data to the image processor 28 (e.g., unidirectional communication) to facilitate occupant classification and/or seat belt status detection. The captured vehicular occupant information can be transmitted from the image sensor 26 to the image processor 28 which can then analyze the images to determine occupant classification and/or seat belt status.

It will be appreciated that, by conducting first and second sampling operations at separate times, a single processor (e.g., image processor 28) can be utilized to perform both functions. Accordingly, separate components need not be provided to facilitate monitoring of occupant classification and seat belt status, and an associated IBOCS (e.g., 14) can be provided more efficiently, more compactly, and less expensively than certain conventional arrangements. Additionally, through combination of processing as described above, it will be appreciated that the IBOCS 14 can expend less waste energy and heat to determine each of an occupant classification and seat belt status.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. An image based occupant classification system comprising:
   an image sensor configured to capture vehicular occupant information; and
   an image processor in communication with the image sensor, the image processor being configured to employ an occupant classification algorithm to facilitate performance of first sampling operations to determine occupant classification and being further configured to employ a seat belt detection algorithm to facilitate performance of second sampling operations to determine a seat belt status, the image processor being further configured to place a first hold on the occupant classification algorithm when employing the seat belt detection algorithm and place a second hold on the seat belt detection algorithm when employing the occupant classification algorithm; wherein:
   each of the first sampling operations facilitates one of actuation of the image sensor to capture vehicular occupant information and analysis of the vehicular occupant information already captured by the image sensor during a preceding first sampling operation;
   each of the second sampling operations facilitates one of actuation of the image sensor to capture vehicular occupant information and analysis of the vehicular occupant information already captured by the image sensor during a preceding second sampling operation; and each of the first sampling operations is conducted at a separate time from each of the second sampling operations.

2. The image based occupant classification system of claim 1 wherein each of the first sampling operations and each of the second sampling operations are performed successively by the image processor.

3. The image based occupant classification system of claim 1 wherein the vehicular occupant information includes near-infrared images.

4. The image based occupant classification system of claim 1 wherein the image processor is further configured to determine, from the second sampling operations, whether an occupant is secured by a seat belt.

5. The image based occupant classification system of claim 4 further comprising a seat belt reminder indicia, wherein the image processor is further configured to actuate the seat belt reminder indicia in response to the seat belt status.

6. The image based occupant classification system of claim 1 further comprising:
a supplemental restraint system processor in communication with the image processor, the supplemental restraint system processor being configured to monitor collision conditions; and
an airbag controller in communication with the supplemental restraint system processor, the airbag controller being configured to selectively deploy an airbag in response to the collision conditions:
wherein the supplemental restraint system processor is further configured to selectively inhibit the airbag controller according to the seat belt status.

7. A vehicle comprising:
a passenger compartment;
a seat belt configured to selectively secure a seated occupant within the passenger compartment;
an image sensor configured to capture vehicular occupant information; and
an image processor in communication with the image sensor and configured to employ an occupant classification algorithm to facilitate performance of first sampling operations to determine occupant classification and being further configured to employ a seat belt detection algorithm to facilitate performance of second sampling operations to determine a seat belt status, the image processor being further configured to place a first hold on the occupant classification algorithm when employing the seat belt detection algorithm and place a second hold on the seat belt detection algorithm when employing the occupant classification algorithm; wherein:
each of the first sampling operations facilitates one of actuation of the image sensor to capture vehicular occupant information and analysis of vehicular occupant information already captured by the image sensor during a preceding first sampling operation;
each of the second sampling operations facilitates one of actuation of the image sensor to capture vehicular occupant information and analysis of vehicular occupant information already captured by the image sensor during a preceding second sampling operation; and
each of the first sampling operations is conducted by the image processor at a separate time from each of the second sampling operations.

8. The vehicle of claim 7 wherein each of the first sampling operations and each of the second sampling operations are performed successively by the image processor.

9. The vehicle of claim 7 wherein at least about ten of the first sampling operations are performed for each of the second sampling operations that is performed by the image processor.

10. The vehicle of claim 7 wherein the vehicular occupant information includes near-infrared images.

11. The vehicle of claim 7 wherein the image processor is further configured to determine, front the second sampling operations, whether an occupant is secured by the seat belt.

12. The vehicle of claim 11 further comprising a seat belt reminder indicia, wherein the image processor is further configured to actuate the seat belt reminder indicia in response to the seat belt status.

13. The vehicle of claim 7 wherein the vehicle comprises a pillar and a ceiling, the passenger compartment is at least partially defined by the pillar and the ceiling, and the image sensor is attached to at least one of the pillar and the ceiling.

14. The vehicle of claim 7 further comprising:
an airbag;
a supplemental restraint system processor in communication with the image processor, the supplemental restraint system processor being configured to monitor collision conditions; and
an airbag controller in communication with the supplemental restraint system processor, the airbag controller being configured to selectively deploy the airbag in response to collision conditions:
wherein the supplemental restraint system processor is further configured to selectively inhibit the airbag controller according to the seat belt status.

15. The vehicle of claim 14 wherein the supplemental restraint system further comprises an accelerometer.

16. An image based occupant classification system comprising:
an image sensor configured to capture vehicular occupant information; and
an image processor in communication with the image sensor, the image processor being configured to employ an occupant classification algorithm to facilitate performance of first sampling operations to determine occupant classification and being further configured to employ a seat belt detection algorithm to facilitate performance of second sampling operations to determine a seat belt status; wherein:
each of the first sampling operations facilitates one of actuation of the image sensor to capture vehicular occupant information and analysis of vehicular occupant information already captured by the image sensor during a preceding first sampling operation;
each of the second sampling operations facilitates one of actuation of the image sensor to capture vehicular occupant information and analysis of vehicular occupant information already captured by the image sensor during a preceding second sampling operation;
each of the first sampling operations is conducted at a separate time from each of the second sampling operations; and
at least about ten of the first sampling operations are performed for each of the second sampling operations that is performed by the image processor.

17. A method comprising:
capturing vehicular occupant information;
employing an occupant classification algorithm;
performing first sampling operations with the occupant classification algorithm, each of the first sampling operations facilitating one of actuating of the image sensor to capture vehicular occupant information and analyzing vehicular occupant information already captured by the image sensor during a preceding first sampling operation;

determining occupant classification from the first sampling operations;

employing a seat belt detection algorithm;

performing second sampling operations with the seat belt detection algorithm at separate times than the first sampling operations, each of the second sampling operations facilitating one of actuating the image sensor to capture vehicular occupant information and analyzing vehicular occupant information already captured by the image sensor during a preceding second sampling operation;

determining seat belt status from the second sampling operations; and employing the occupant classification algorithm at least about ten times for each time that the seat belt detection algorithm is employed.

18. A method comprising:

capturing vehicular occupant information;

employing an occupant classification algorithm;

performing first sampling operations with the occupant classification algorithm, each of the first sampling operations facilitating one of actuating of the image sensor to capture vehicular occupant information and analyzing vehicular occupant information already captured by the image sensor during a preceding first sampling operation;

determining occupant classification from the first sampling operations;

employing a seat belt detection algorithm;

performing second sampling operations with the seat belt detection algorithm at separate times than the first sampling operations, each of the second sampling operations facilitating one of actuating the image sensor to capture vehicular occupant information and analyzing vehicular occupant information already captured by the image sensor during a preceding second sampling operation;

determining seat belt status from the second sampling operations; and placing a first hold on the occupant classification algorithm during employment of the seat belt detection algorithm; and placing a second hold on the seat belt detection algorithm during employment of the occupant classification algorithm.

19. The method of claim 18 further comprising employing the occupant classification algorithm and the seat belt detection algorithm successively.

20. The method of claim 18 further comprising repeating the occupant classification algorithm at least twice when the second hold is placed on the seat belt detection algorithm.

21. The method of claim 18 further comprising repeating the seat belt detection algorithm at least twice when the first hold is placed on the occupant classification algorithm.

* * * * *

UNITED STATES PATENT AND TRADEMARK OFFICE
CERTIFICATE OF CORRECTION

| | | |
|---|---|---|
| PATENT NO. | : 8,036,795 B2 | |
| APPLICATION NO. | : 12/247376 | |
| DATED | : October 11, 2011 | |
| INVENTOR(S) | : Brian T. Allen | |

It is certified that error appears in the above-identified patent and that said Letters Patent is hereby corrected as shown below:

Column 4, line 13, change "detection" to -- deflection --;
Column 5, line 51, change "failing" to -- falling --;
Claim 6, column 9, line 28, change "conditions:" to -- conditions; --;
Claim 6, column 9, line 31, change "scat" to -- seat --;
Claim 11, column 10, line 8, change "front" to -- from --; and
Claim 14, column 10, line 27, change "conditions:" to -- conditions; --.

Signed and Sealed this
Thirty-first Day of January, 2012

David J. Kappos
*Director of the United States Patent and Trademark Office*